United States Patent [19]
Yamamoto et al.

[11] Patent Number: 6,021,235
[45] Date of Patent: Feb. 1, 2000

[54] WAVELENGTH-DIVISION MULTIPLEXING OPTICAL TRANSMISSION SYSTEM

[75] Inventors: Shu Yamamoto, Shiki; Hidenori Taga, Sakado; Masatoshi Suzuki, Kawajima-machi; Noboru Edagawa, Higashimatsuyama; Shigeyuki Akiba, Tokyo, all of Japan

[73] Assignee: Kokusai Denshin Denwa Kabushiki-Kaisha, Japan

[21] Appl. No.: 09/127,564

[22] Filed: Jul. 31, 1998

[30] Foreign Application Priority Data

Jul. 31, 1997 [JP] Japan .................................. 9-206320

[51] Int. Cl.$^7$ ....................................................... G02B 6/28
[52] U.S. Cl. ................................ 385/24; 385/15; 385/31; 385/27; 359/124; 359/159; 359/161
[58] Field of Search ................................ 385/15–24, 27, 385/31, 46, 122–128; 359/109, 114, 124, 143, 154, 159, 161, 180, 189

[56] References Cited

U.S. PATENT DOCUMENTS 5,675,429 10/1997 Henmi et al. ...................... 359/161 X
5,822,474 10/1998 Hara .......................................... 385/24

*Primary Examiner*—Phan T. H. Palmer
*Attorney, Agent, or Firm*—Olson & Hierl, Ltd.

[57] ABSTRACT

A new two-way WDM optical transmission system is provided. The WDM optical transmission system comprises a two-way optical fiber cable, a first dispersion compensation optical fiber (DCOF) connected to one end of the optical fiber cable, a second DCOF connected to another end of the optical fiber cable, a chromatic dispersion compensating transmitter unit and a chromatic dispersion compensating receiver unit. The two-way optical fiber cable comprises a plurality of segments. The first DCOF is connected to one end of the optical fiber cable and has a compensation amount of a half of a one segment dispersion $D_c$ of the optical fiber cable. The second DCOF is connected to another end of the optical fiber cable and has the compensation amount of the half of the one segment dispersion $D_c$. And the chromatic dispersion compensating transmitter unit compensates accumulated residual chromatic dispersions to be caused by higher-order wavelength dispersion of the optical fiber cable at each signal wavelength. Further, the chromatic dispersion compensating receiver unit compensates accumulated residual chromatic dispersions caused by higher-order wavelength dispersion of the optical fiber cable at each signal wavelength. The chromatic dispersion compensating transmitter unit has a plurality of optical transmitters, a multiplexer combining a plurality of different wavelength bands and a plurality of chromatic dispersion compensators. And the chromatic dispersion compensating receiver unit has a demultiplexer, a plurality of optical receiver and a plurality of chromatic dispersion compensators.

20 Claims, 18 Drawing Sheets

WAVELENGTH-DIVISION MULTIPLEXING OPTICAL TRANSMISSION SYSTEM

BACKGROUND OF THE INVENTION

1. Field of the Invention

The present invention relates to a wavelength-division multiplexing (WDM) optical transmission system, in which pluralities of wavelength bands are multiplexed and transmitted bidirectionally along a pair of optical fibers.

2. Description of the Related Art

In recent years, the amplifier repeater transmission systems using the WDM optical signals have been widely used in optical fiber transmission systems. This is because the WDM optical signals, which comprise pluralities of multiplexed wavelength bands (channels), can be amplified in a simple single operation by optical amplifier repeaters using optical fiber amplifiers.

In particular, systems for transmitting high-density WDM optical signals over long distances use a method for reducing the effects of four-wave mixing (FWM: also referred as "four-photon mixing"), which is caused by the third-order nonlinearity in the optical fiber and combinations of different wavelengths. According to this method, positive-dispersion optical fibers are inserted periodically along transmission optical fibers which cancel the negative accumulated dispersion in the transmission optical fibers, in order to prevent signal distortion caused by accumulated dispersion, while ensuring that the chromatic dispersion of the transmission optical fibers is not zero within the signal wavelength bands. As a result, the accumulated value of the total dispersion is approximately zero, and there is no local accumulation of zero dispersion.

However, chromatic dispersion of optical fibers has wavelength dependence on higher-order dispersion. Consequently, accumulated wavelength dispersion at the central wavelength of the multiplexed wavelength bands may for instance be as shown in FIG. 1. In FIG. 1, in comparison with the central wavelength $\lambda_b$, which has a one segment dispersion $D_c$, the longer (maximum) wavelength $\lambda_a$, suffers positive accumulated dispersion of $D_y$ (ps/nm) giving dispersion $D_y-D_c$, while the shorter (minimum) wavelength $D_x$ (ps/nm) accumulates negatively, with dispersion of $-D_x-D_c$.

FIG. 2 is a block diagram illustrating a diagrammatic configuration for compensating accumulated dispersion in a conventional WDM optical transmission system. The conventional WDM optical transmission system has a plurality of optical transmitters 1, a multiplexer(MUX) 5 combining (multiplexing) a plurality of different wavelength bands transmitted by the optical transmitters 1. The optical transmitters include the optical transmitters 1 which transmit optical signals at minimum, central and maximum wavelength bands. And the conventional WDM optical transmission system further has a demultiplexer(DEMUX) 23, a plurality of optical receiver 27 and a plurality of DCOFs 31,32,33. The DCOF 31 has the amount of compensating dispersion $D_x+D_c$, the DCOF 32 has the amount of compensating dispersion $D_c$ and the DCOF 33 has the amount of compensating dispersion $-D_y+D_c$. The two-way optical fiber cable shown in FIG. 2 has a pair of optical fibers, and the optical fiber cable comprises a plurality of segments. In FIG. 2, a plurality of in-line amplifiers (optical amplifier repeaters) 9 are also shown as periodically inserted in the optical fiber cable.

As FIG. 2 shows, in order to achieve overall accumulated dispersion of zero, the signals at respective wavelength bands are first separated by means of a demultiplexer 23. Then, dispersion compensation DCOFs 31,32,33 having compensating dispersions which are counter to the accumulated dispersions are inserted, the length of the inserted DCOFs being selected as approximately sufficient to cancel the one segment dispersion $D_c$. In this way, it is possible to provide a dispersion compensator to compensate different accumulated dispersions as required.

For instance, when WDM signals are transmitted within a 1.55 μm wavelength band, accumulated dispersion resulting from higher-order dispersion and wavelength dependence of fiber material is negative for wavelength bands shorter than central wavelength $\lambda_b$, where accumulated dispersion is zero. Therefore, since an optical fiber having zero dispersion within a wavelength band of 1.3 μm has positive dispersion of approximately 17 ps/km-nm in a wavelength band of 1.55 μm, such an optical fiber has been used as the DCOF to compensate negative dispersion.

By contrast, for wavelength bands longer than the central wavelength $\lambda_b$, accumulated dispersion resulting from the wavelength dependence of fiber material and higher-order dispersion is positive. Therefore, an optical fiber which has negative dispersion within a wavelength band of 1.55 μm has been used as a DCOF for compensating positive dispersion.

More specifically, for example, when oceanic long-haul optical submarine cables using WDM transmission have the above configuration, the DCOFs inevitably become extremely long as the number of multiplexed wavelength bands increases.

For instance, in WDM transmission with 20 wavelength bands being propagated over 9000 km at wavelength intervals of 0.6 nm, when higher-order dispersion is 0.1ps/km-nm$^2$, the signal with the minimum wavelength would require nearly 500 km of 1.3 μm zero-dispersion DCOF, even after compensating the transmission line dispersion to the central wavelength.

FIG. 3 is a block diagram illustrating another configuration for compensating accumulated dispersion in a conventional WDM optical transmission system. As FIG. 3 shows, a DCOF 34 corresponding to one segment dispersion $D_c$ is inserted in the transmission line on the receiver side of the transmission cable.

However, as FIG. 4 shows, in an actual communications system the optical transmission line is comprised from two-way optical fibers, along which optical signals are transmitted bidirectionally. In other words, the optical cable contains a pair of optical fibers. Then, in the system that a DCOF 34 corresponding to one segment dispersion compensation is inserted at the receiver side of the transmission cable (i.e. the pair of optical fibers) as described above, when transmitting in the opposite direction, a dispersion compensation cable must be connected at the transmitter side, leading to a loss of bidirectional symmetry.

Such asymmetrical dispersion accumulation is particularly likely to cause disparity in transmission characteristics between the two transmission directions in long-haul systems. Therefore, in conventional systems, the receiver unit contains DCOFs 35 having a length sufficient for compensating the final dispersion compensation segment of the transmission line. As a consequence, dispersion compensation at the receiver unit has had to be carried out with respect to the sum of the amount of compensation of chromatic dispersion, caused by wavelength difference and higher-order wavelength dispersion, and the amount of dispersion compensated in one dispersion compensation segment of the transmission line. This has a disadvantage that the DCOF for equalizing the dispersion, which is provided to the receiver, must be extremely long.

Furthermore, as FIG. 5 shows, another method has been proposed in which elongation of the dispersion equalization optical fibers is eased. In FIG. 5, DCOFs 31 on the receiver side in FIG. 2 were respectively divided into two parts 38 and 37. And the parts 38 having dispersion $(1-m)D_x$ are inserted into the transmitter side, and the part 37 having dispersion $mD_x+D_c$ are inserted into the receiver side. In this method, to compensate for the dispersion deviation caused by the wavelength difference with the higher-order wavelength dispersion, DCOFs 38 having an approximately 50% (m=0.5) of the dispersion compensation against the dispersion deviation at each wavelength are inserted at the transmitter side. FIG. 6 depicts the accumulated wavelength dispersion at the central wavelength at this point. As FIG. 6 shows, the configuration depicted in FIG. 5 improves the transmission characteristics.

However, even when the configuration illustrated in FIG. 5 is implemented in an actual lightwave communications system transmitting bidirectionally along optical fibers, the receiving unit must contain DCOFs 37 for one dispersion compensation segment of the transmission line at the receiver side, in order to maintain transmission line symmetry.

According to the conventional optical transmission system configuration described above, the receiver unit must contain a DCOF 37 for the last dispersion compensation segment of the transmission line. Moreover, each wavelength band requires a DCOF to compensate the residual accumulated dispersion of the wavelength bands.

SUMMARY OF THE INVENTION

The present invention has been realized after consideration of the above points and aims to provide a WDM optical transmission system wherein the lengths of DCOFs inserted in the transmitter unit and in the receiver unit can be reduced and transmission characteristics can be improved.

In order to achieve the above object, a first aspect of the present invention pertains to a wavelength-division multiplexing (WDM) optical transmission system for transmitting bidirectionally a plurality of optical signals having different wavelength bands. The WDM optical transmission system of the first aspect comprises a two-way optical fiber cable, a first dispersion compensation optical fiber (DCOF) connected to one end of the optical fiber cable, a second DCOF connected to another end of the optical fiber cable, a chromatic dispersion compensating transmitter unit and a chromatic dispersion compensating receiver unit. The two-way optical fiber cable has a pair of optical fibers and the optical fiber cable comprises a plurality of segments. The first DCOF is connected to one end of the optical fiber cable and has a compensation amount of a half of a one segment dispersion of the optical fiber cable. The second DCOF is connected to another end of the optical fiber cable and has the compensation amount of the half of the one segment dispersion of the optical fiber cable. And the chromatic dispersion compensating transmitter unit compensates accumulated residual chromatic dispersions to be caused by higher-order wavelength dispersion of the optical fiber cable at each signal wavelength. Further, the chromatic dispersion compensating receiver unit compensates accumulated residual chromatic dispersions caused by higher-order wavelength dispersion of the optical fiber cable at each signal wavelength. The chromatic dispersion compensating transmitter unit may have a plurality of optical transmitters, a multiplexer combining a plurality of different wavelength bands and a plurality of chromatic dispersion compensators. And the chromatic dispersion compensating receiver unit may have a demultiplexer, a plurality of optical receiver and a plurality of chromatic dispersion compensators.

According to the first aspect of the present invention, a DCOF for one segment dispersion compensation of the transmission line, which is normally provided within the optical fiber cable periodically, is split in two and connected to both ends of the two-way optical fiber cable as the first and second DCOFs. Furthermore, DCOFs for compensating the chromatic dispersion deviation, caused by higher-order dispersion and wavelength difference, are split and inserted in the chromatic dispersion compensating transmitter and receiver units. There is no loss of symmetry within a two-way transmission system. In other words, according to the WDM optical transmission system of the present invention, the lengths of the DCOFs in the chromatic dispersion compensating transmitter and receiver units can be shortened, enabling the scale of the WDM optical transmission system to be reduced and made economical while improving transmission characteristics.

A second aspect of the present invention also pertains to a WDM optical transmission system for transmitting bidirectionally a plurality of optical signals having different wavelength bands. The WDM optical transmission system of the second aspect comprises a two-way optical fiber cable, a DCOF connected to one end of the optical fiber cable, a half of the segment of the optical fiber cable connected to the one end of the optical fiber cable through the DCOF, a chromatic dispersion compensating transmitter unit and a chromatic dispersion compensating receiver unit. The half of the segment of the optical fiber cable may be removed from another end of the optical fiber cable. The two-way optical fiber cable has a pair of optical fibers and the optical fiber cable comprises a plurality of segments. The DCOF has a compensation amount of one segment dispersion of the optical fiber cable. And the chromatic dispersion compensating transmitter unit compensates accumulated residual chromatic dispersions to be caused by higher-order wavelength dispersion of the optical fiber cable at each signal wavelength. Further, the chromatic dispersion compensating receiver unit compensates accumulated residual chromatic dispersions caused by higher-order wavelength dispersion of the optical fiber cable at each signal wavelength. The chromatic dispersion compensating transmitter unit may have a plurality of optical transmitters, a multiplexer combining a plurality of different wavelength bands and a plurality of chromatic dispersion compensators. And the chromatic dispersion compensating receiver unit may have a demultiplexer, a plurality of optical receiver and a plurality of chromatic dispersion compensators.

According to the second aspect of the present invention, there is no loss of symmetry within a two-way transmission system. In other words, according to the WDM optical transmission system of the second aspect, the lengths of the DCOFs in the chromatic dispersion compensating transmitter and receiver units can be shortened, enabling the scale of the WDM optical transmission system to be reduced and made economical while improving transmission characteristics.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the present invention in practice.

DESCRIPTION OF THE PREFERRED EMBODIMENTS

Figure 1:
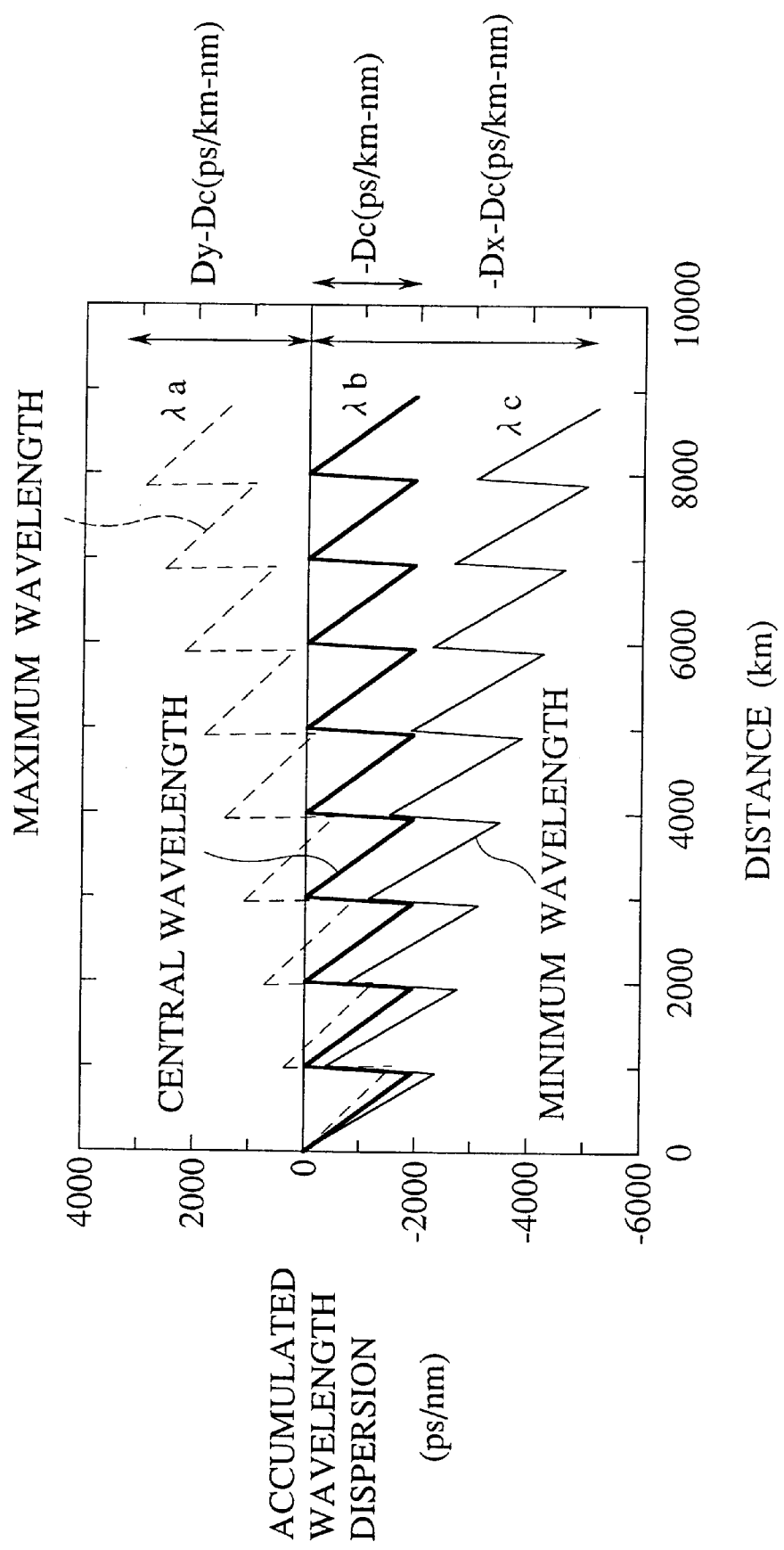
FIG. 1 is a diagram explaining accumulated wavelength dispersion at each wavelength when wavelength bands are multiplexed in a conventional WDM optical transmission system.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(BASIC CONFIGURATION)

Figure 4:
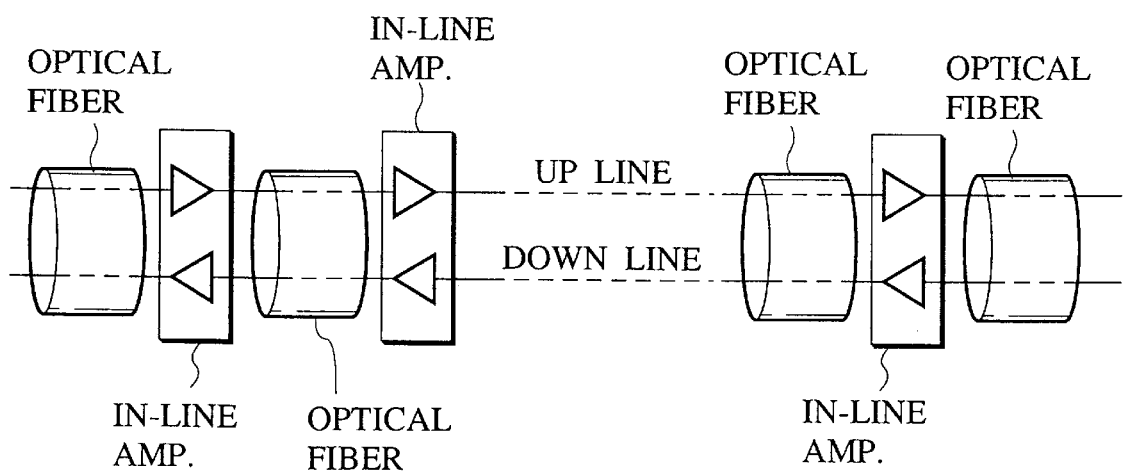
FIG. 4 is a diagram showing a configuration of a two-way optical transmission line in an actual communications system.
Figure 7:
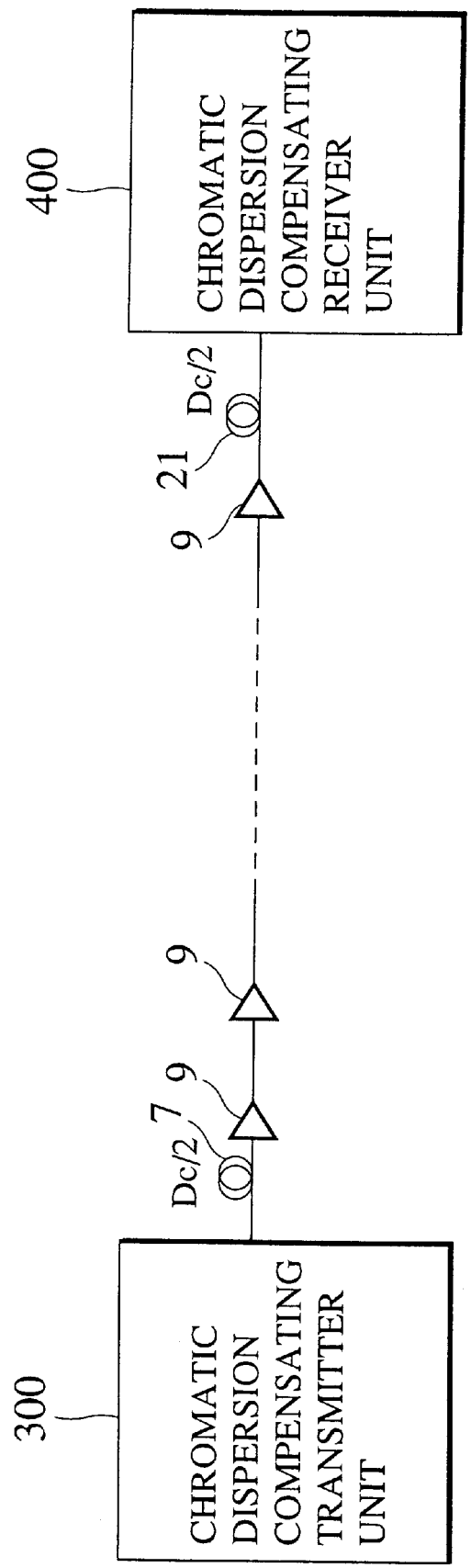
FIG. 7 is a basic configuration of a WDM optical transmission system according to the present invention.

FIG. 7 shows a basic configuration of the present invention pertaining to a WDM optical transmission system for transmitting bidirectionally a plurality of optical signals having different wavelength bands (channels). The WDM optical transmission system shown in FIG. 7 comprises a two-way optical fiber cable, a first DCOF 7 connected to one end of the optical fiber cable, a second DCOF 21 connected to another end of the optical fiber cable, a chromatic dispersion compensating transmitter unit 300 and a chromatic dispersion compensating receiver unit 400. The two-way optical fiber cable has a pair of optical fibers. Further, the optical fiber cable comprises a plurality of segments as shown in FIG. 4. In FIG. 7, a plurality of in-line amplifiers 9, or the optical amplifier repeaters 9 are inserted periodically in the optical fiber cable. The first DCOF 7 is connected to one end of the optical fiber cable and has a compensation amount of a half of a one segment dispersion $D_c$ of the optical fiber cable. The second DCOF 21 is connected to another end of the optical fiber cable and has the compensation amount of the half of the one segment dispersion $D_c$ of the optical fiber cable. And the chromatic dispersion compensating transmitter unit 300 compensates accumulated residual chromatic dispersions to be caused by higher-order wavelength dispersion of the optical fiber cable at each signal wavelength. Further, the chromatic dispersion compensating receiver unit 400 compensates accumulated residual chromatic dispersions caused by higher-order wavelength dispersion of the optical fiber cable at each signal wavelength.

According to the basic configuration of the present invention shown in FIG. 7, a DCOF for one segment dispersion compensation of the transmission line, which is normally provided within the optical fiber cable periodically, is split in two sub-DCOFs and they are connected to both ends of the two-way optical fiber cable as the first DCOF 7 and the second DCOF 21. Furthermore, chromatic dispersion compensators for compensating the chromatic dispersion deviation, caused by higher-order dispersion and wavelength difference, are split and inserted in the chromatic dispersion compensating transmitter unit 300 and the chromatic dispersion compensating receiver unit 400. There is no loss of symmetry within a two-way transmission system. In other words, according to the WDM optical transmission system of the present invention, the lengths of the DCOFs used as the chromatic dispersion compensators in the chromatic dispersion compensating transmitter and receiver units can be shortened, enabling the scale of the WDM optical transmission system to be reduced and made economical while improving transmission characteristics.

(FIRST EMBODIMENT)

Figure 8:
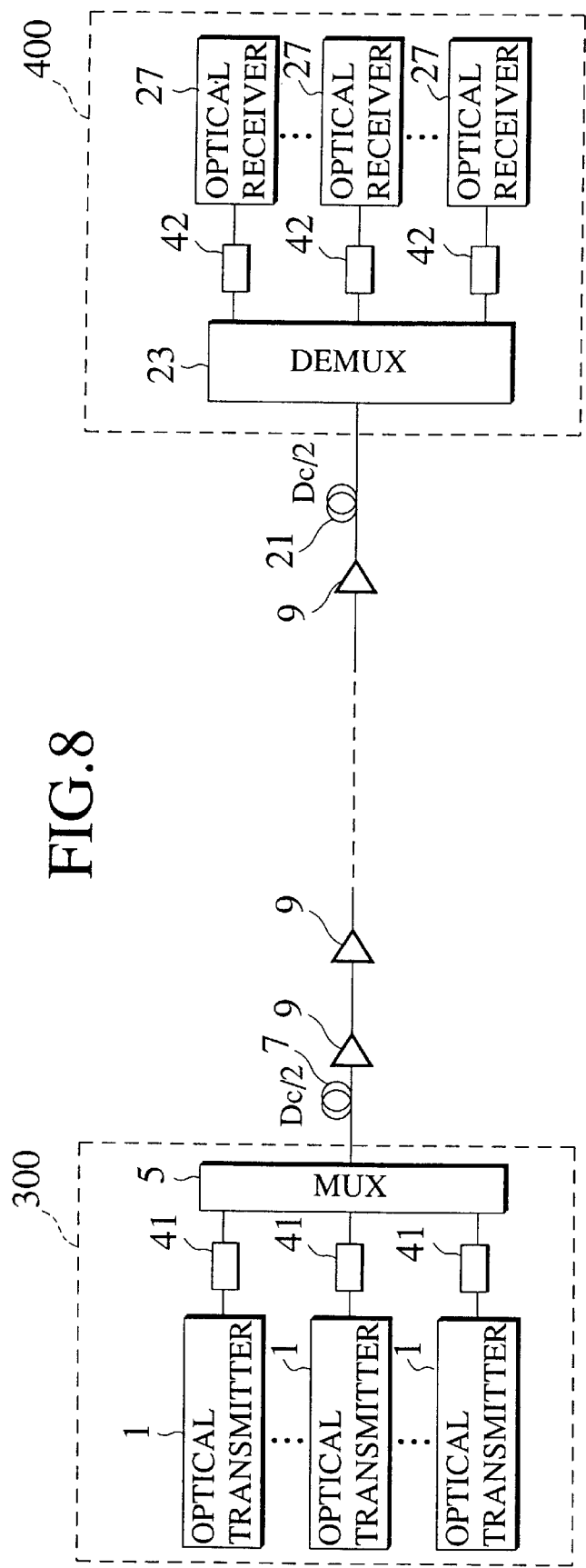
FIG. 8 is a block diagram showing a configuration of a WDM optical transmission system according to a first embodiment of the present invention.

A first embodiment of the present invention will next be explained with reference to the drawings. FIG. 8 shows details of the chromatic dispersion compensating transmitter unit 300 and the chromatic dispersion compensating receiver unit 400 in the WDM optical transmission system shown in FIG. 7, as the first embodiment of the present invention. The chromatic dispersion compensating transmitter unit 300 has a plurality of optical transmitters 1, a multiplexer 5 combining (multiplexing) a plurality of different wavelength bands and a plurality of chromatic dispersion compensators 41. And the chromatic dispersion compensating receiver unit 400 has a demultiplexer 23, a plurality of optical receiver 27 and a plurality of chromatic dispersion compensators 42. The two-way optical fiber cable shown in FIG. 8 has a pair of optical fibers, and the optical fiber cable comprises a plurality of segments. In FIG. 8, a plurality of in-line amplifiers (optical amplifier repeaters) 9 are also shown as periodically inserted in the optical fiber cable.

Figure 9:
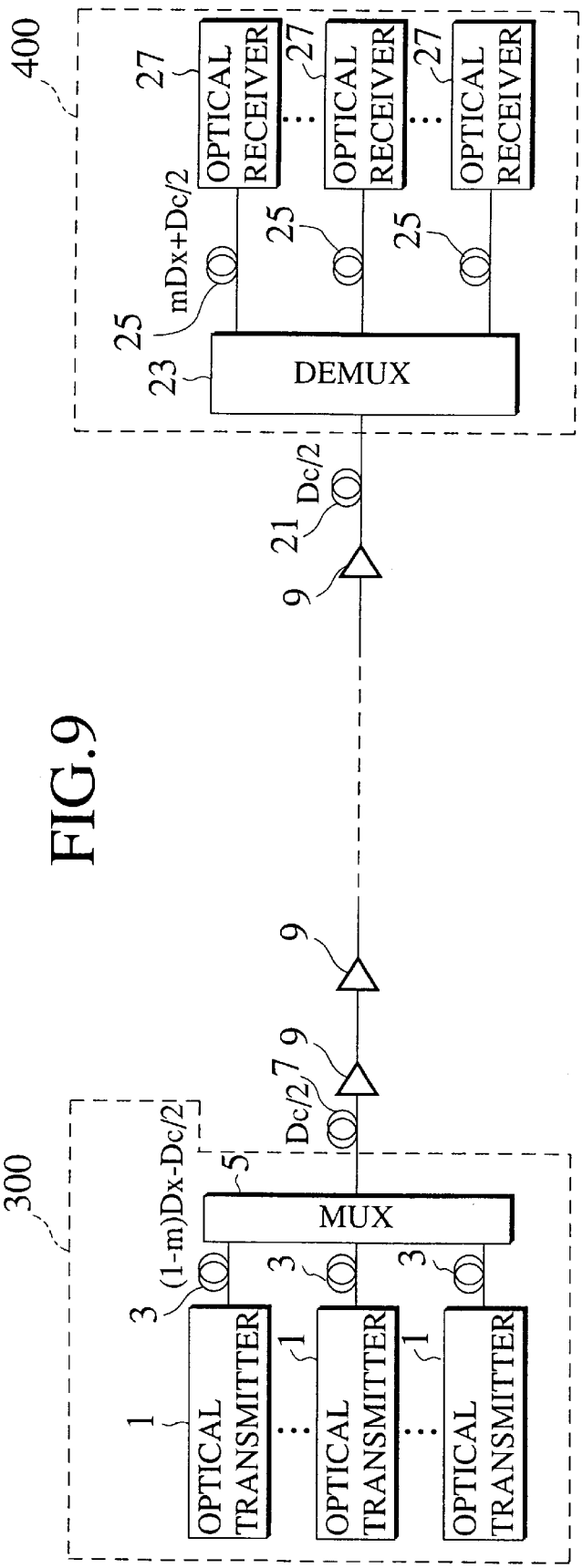
FIG. 9 is a block diagram showing a preliminary example of the chromatic dispersion compensators in the WDM optical transmission system depicted in FIG. 8.
Figure 10:
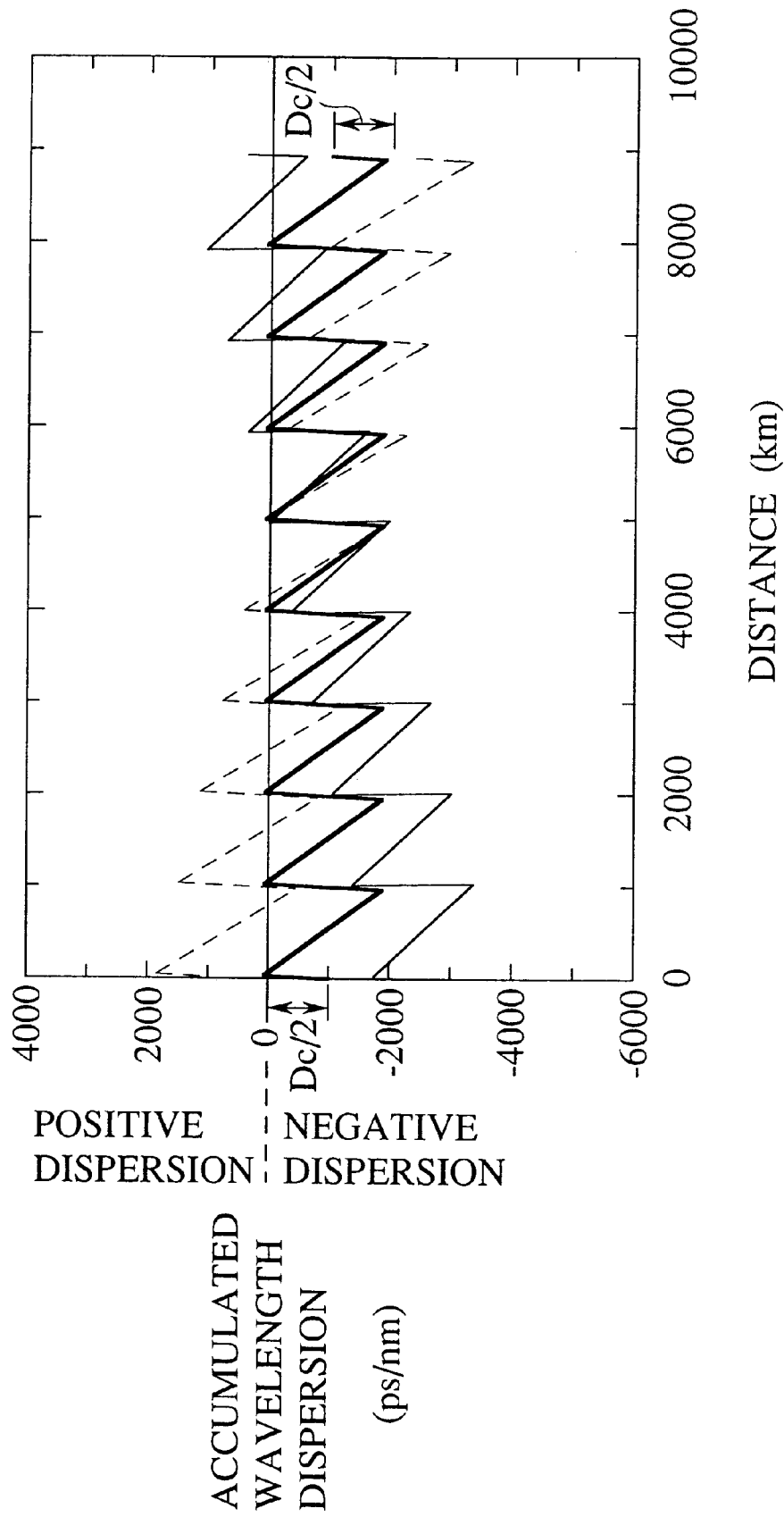
FIG. 10 is a diagram explaining wavelength dispersion accumulation of each wavelength when wavelength bands are multiplexed in the WDM optical transmission system depicted in FIG. 9.

FIG. 9 shows a structure of the chromatic dispersion compensators 41, 42 as a preliminary example. As FIG. 9 shows, when a DCOF corresponding to one segment dispersion $D_c$ of the optical fiber cable is divided to form a first DCOF 7 and a second DCOF 21. And the DCOFs 7, 21 having the amount of dispersion $D_c/2$ are respectively connected to both ends of the transmission cable. And the DCOFs 25 at the receiver side are combined to another DCOFs to have the amount of dispersion $mD_x+D_c/2$. The DCOFs 3 at the transmitter side are formed to have the amount of dispersion $(1-m)D_x-D_c/2$. The these combined DCOFs 3, 25 are inserted on the transmitter side and the receiver side, respectively, and the length of the DCOF 3 in the transmitter unit 300 can be shortened. Moreover, as FIG. 10 shows, there is no loss of two-way symmetry on the transmission line.

Figure 6:
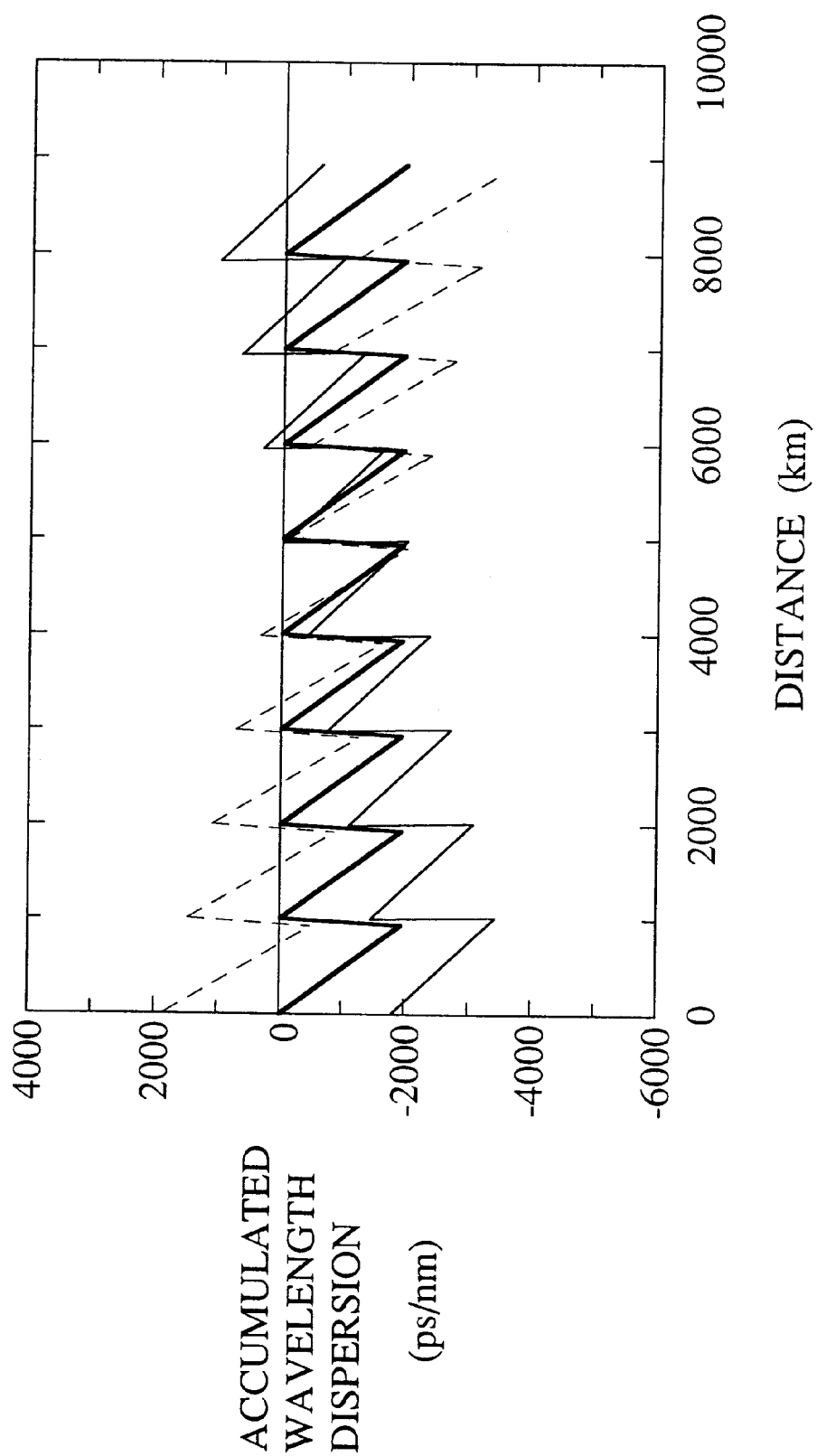
FIG. 6 is a diagram explaining accumulated wavelength dispersion at each wavelength when wavelength bands are multiplexed in a conventional WDM optical transmission system depicted in FIG. 5.

As FIG. 9 shows, when producing the same state as that depicted in FIG. 6 using a configuration of the present invention, the length of the DCOFs 3 in the transmitter unit 300 can be shortened by 50% of the one segment dispersion $D_c$ of the optical fiber cable at wavelength bands shorter than a central wavelength, which is equalized to zero. Here, the length of the DCOFs 25 in the receiver unit 400 must be increased by $D_c/2$.

On the contrary, at longer wavelength bands, the length of the DCOFs in the transmitter unit 300 increases and that in the receiver unit 400 decreases. FIG. 10 shows the dispersion accumulation of each wavelength. Namely, according to this method, in a case when, for instance, the transmission line has positive dispersion, the DCOF for wavelength bands which accumulate positive dispersion must be longer than in a case when DCOFs for correcting negative dispersion are not provided in the transmission line.

Figure 11:
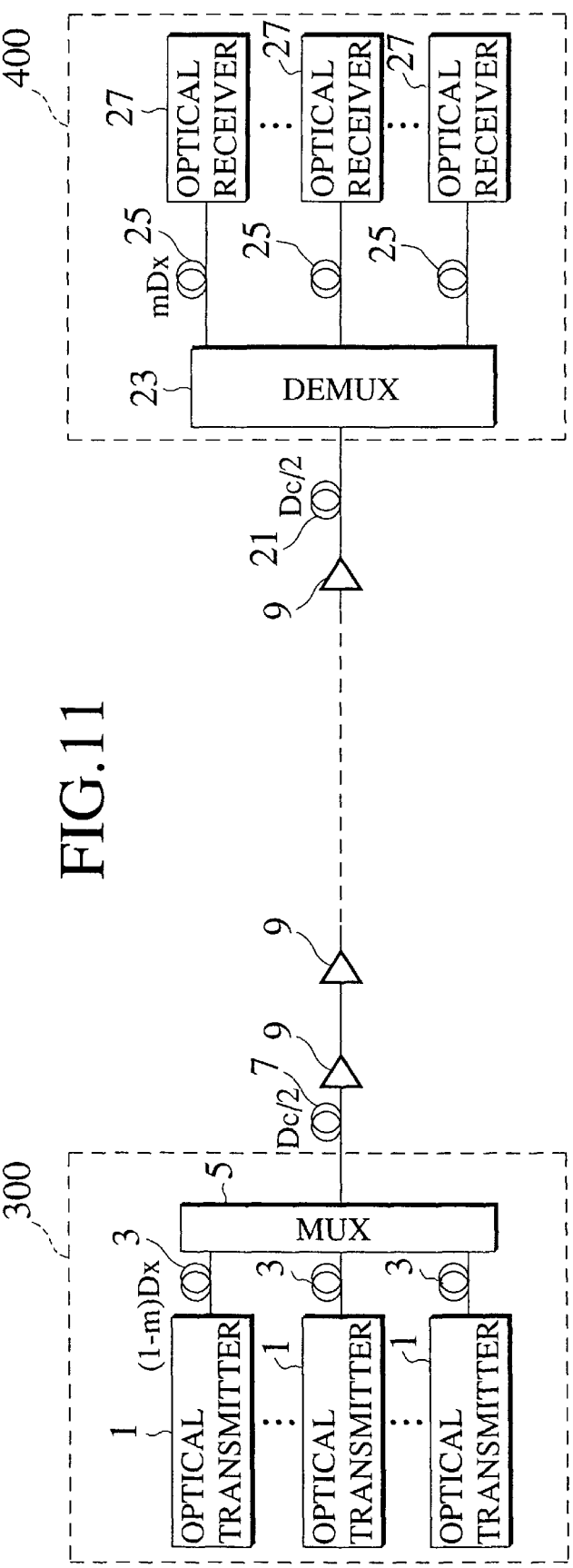
FIG. 11 is a block diagram showing a WDM optical transmission system according to a first embodiment of the present invention.
Figure 12:
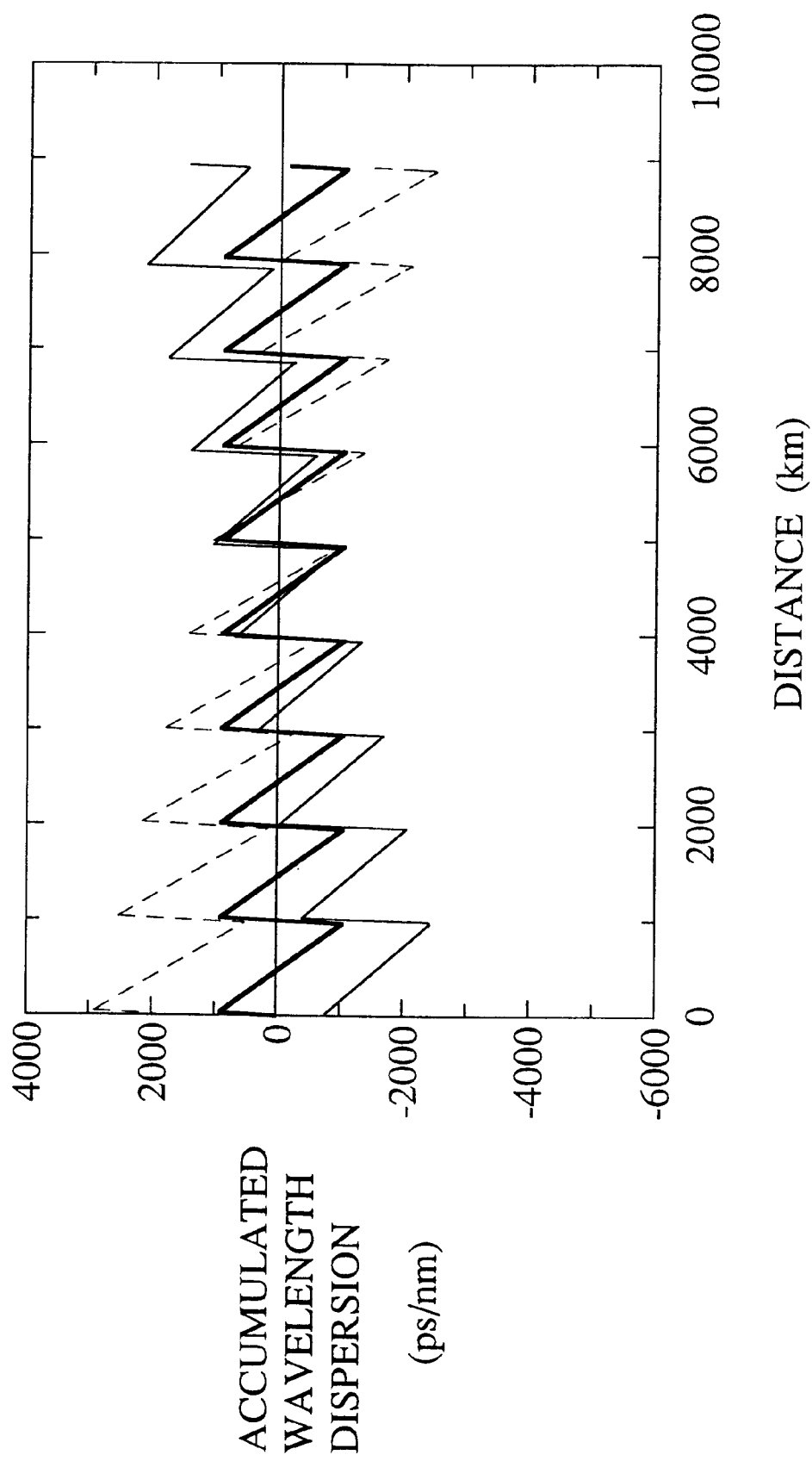
FIG. 12 is a diagram explaining accumulated wavelength dispersion of each wavelength when wavelength bands are multiplexed in the WDM optical transmission system depicted in FIG. 11.

Then, as FIG. 11 shows, by distributing only those DCOFs 3,25 which compensate accumulated residual dispersion $D_x$, caused by higher-order dispersion, to the transmitter unit 300 side and receiver unit 400 side, the length of the DCOFs can reliably be reduced by the length of one segment dispersion compensation of the transmission line (FIG. 12).

As FIG. 11 shows, DCOFs 7,21 having 50% of the one segment dispersion compensation amount $D_c$ of the transmission line are distributed and connected to the two ends of the transmission cable. "The one segment dispersion compensation amount $D_c$" is the dispersion compensation amount for one segment dispersion of the transmission line. This ensures bidirectional symmetry along the transmission line. Furthermore, dispersion deviation resulting from wavelength difference and the higher-order dispersion is also distributed between the transmitter and receiver sides. Consequently, the amount of dispersion equalization at the transmitter and receiver sides corresponds only to the dispersion deviation, caused by wavelength difference, which is to be compensated.

FIG. 12 shows the accumulated wavelength dispersion according to the configuration shown in FIG. 11. In this configuration, the central wavelength, where accumulated dispersion is zero, does not require dispersion equalization on the transmitter and receiver sides.

Figure 13:
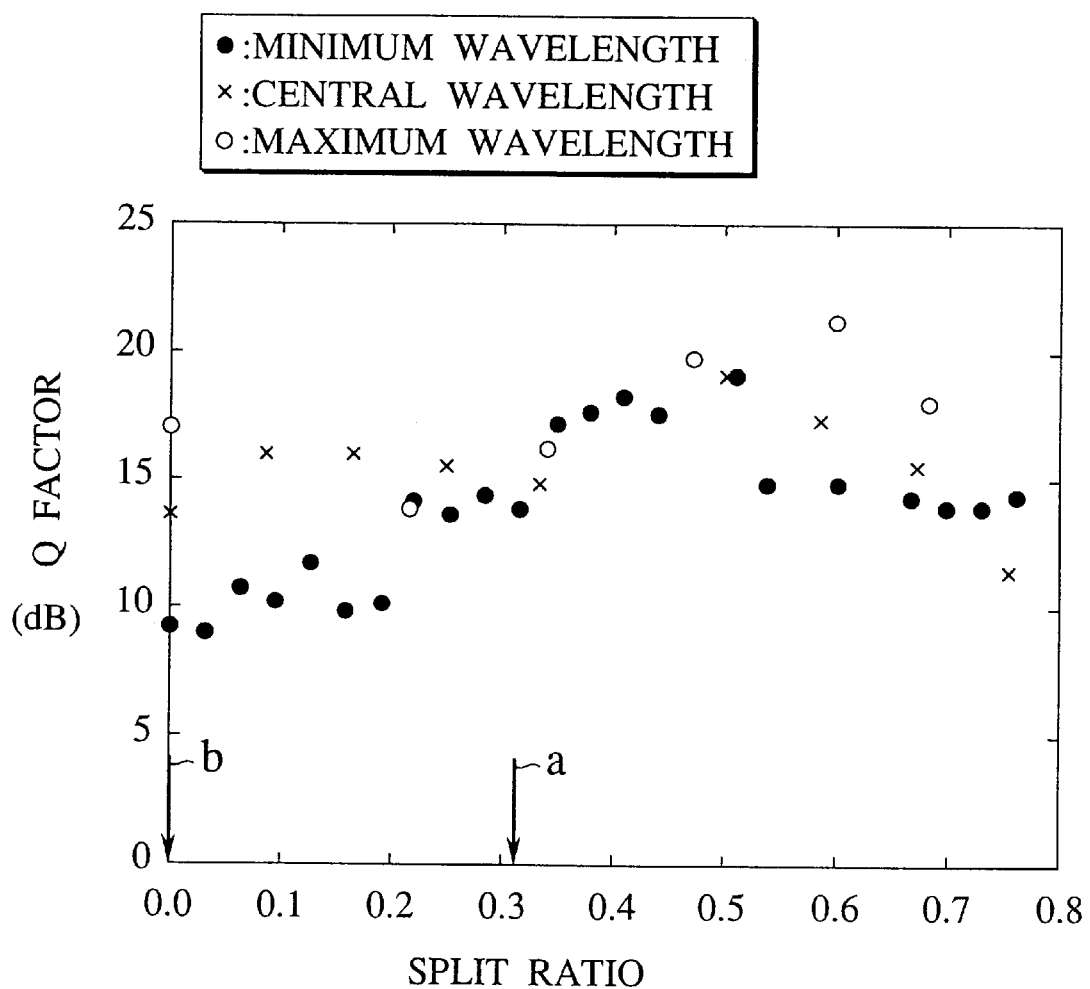
FIG. 13 is a diagram showing a result of simulation illustrating the relation between split ratios and Q factors. The split ratio is defined as the ratio of compensation amount of DCOF inserted in transmitter side to total amount of compensation.

FIG. 13 shows calculator simulation results in a case where a 10.66 Gb/s signal was multiplexed into 10 wavelength bands and transmitted over 9000 km. Q values (Q factors (dB)) indicating transmission performance were calculated for "split ratios", and the Q factors are plotted for the minimum, central and maximum wavelength bands. "The split ratio" is defined as the ratio of "the divided dispersion compensation amounts inserted to the transmitter side" against to "the sum of the one segment dispersion compensation amount $D_c$ and the accumulated residual dispersion compensation amount". The accumulated residual dispersion compensation is the compensation amount for all the wavelength bands, resulting from higher-order dispersion. As FIG. 13 shows, for all wavelength bands, transmission characteristics were optimum when the split ratios are 0.5.

Figure 5:
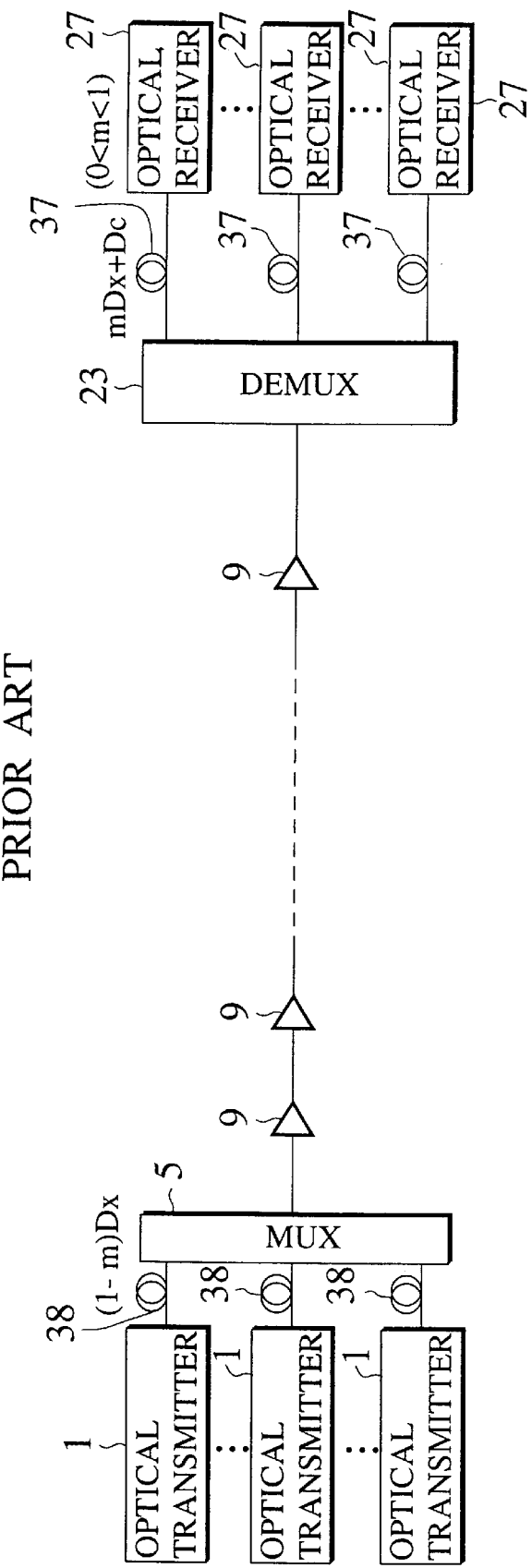
FIG. 5 is a block diagram illustrating another configuration for compensating accumulated dispersion in a conventional WDM optical transmission system.

By contrast, arrow "a" in FIG. 13 show the split ratio of the compensation amounts inserted to the transmitter side against to the accumulated residual dispersion amount, or the dispersion deviation caused by wavelength difference, already depicted in FIGS. 5 and 6, where 50% of the dispersion deviation caused by wavelength difference was split to the transmitter side. That is, if we assume the one segment dispersion compensation amount $D_c$=2000, the accumulated residual dispersion compensation amount is 3600, the split ratio is given as: 1800/(2000+3600)=0.32. For the central wavelength, the split ratio is given as: 0/(2000+0)=0. The arrow "b" in FIG. 13 show the split ratio for the central wavelength: the split ratio of "0" indicates that all dispersion has been equalized at the receiver side. Although the values of the split ratio larger than 0.8 is not shown in FIG. 13, the corresponding arrow representing the split ratio for the maximum wavelength, where 50% of the dispersion deviation caused by wavelength difference was split and inserted to the transmitter side, was approximately 1.1. This is due to the negative accumulated residual dispersion compensation amount for the maximum wavelength. Namely, the split ratio is given as: −1800/(2000−3600)= 1.125. And a Q factor of 17 dB at the split ratio was calculated. And, when the value on the horizontal axis was around 0.5, the Q factor calculated was 20~21 dB for the maximum wavelength.

From the above explanation it can be understood that the present configuration achieves improved transmission characteristics.

Figure 2:
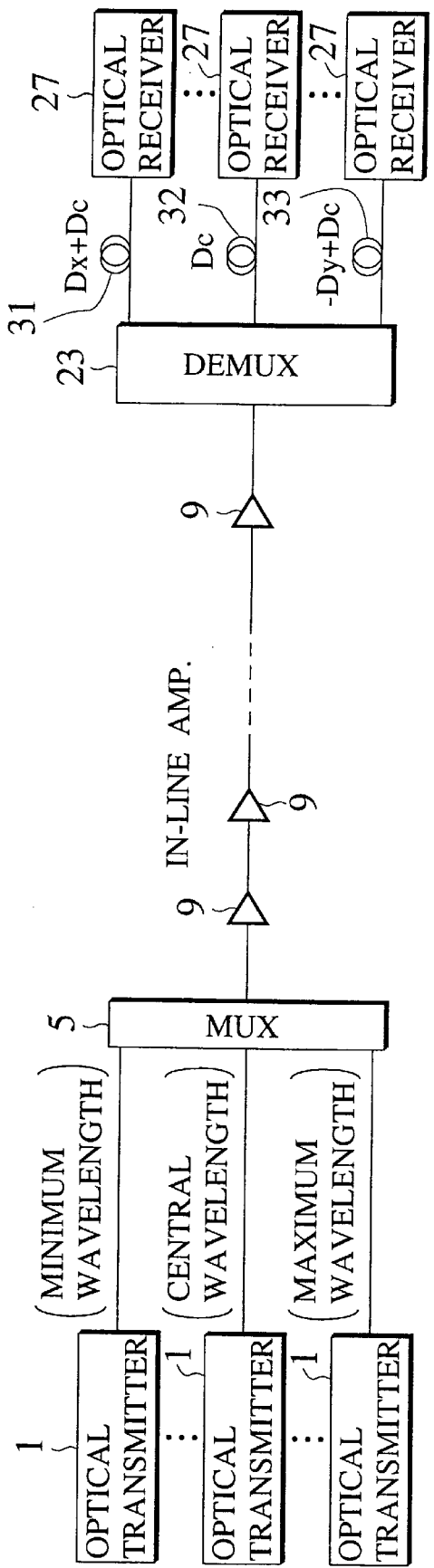
FIG. 2 is a block diagram illustrating a diagrammatic configuration for compensating accumulated dispersion in a conventional WDM optical transmission system.
Figure 3:
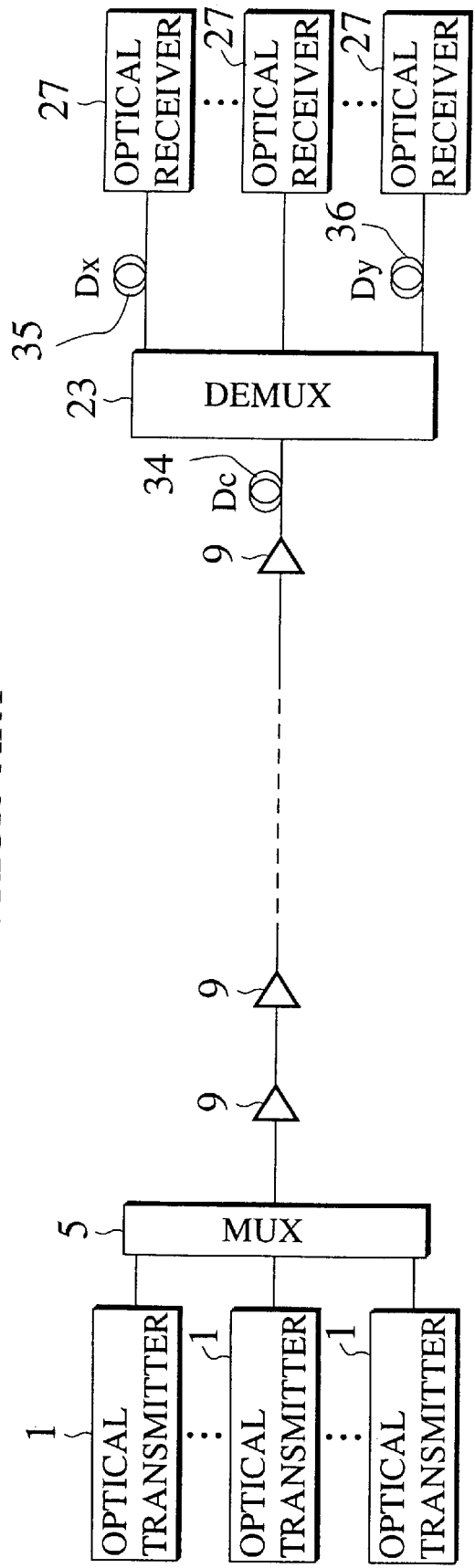
FIG. 3 is a block diagram illustrating another configuration for compensating accumulated dispersion in a conventional WDM optical transmission system.
Figure 14:
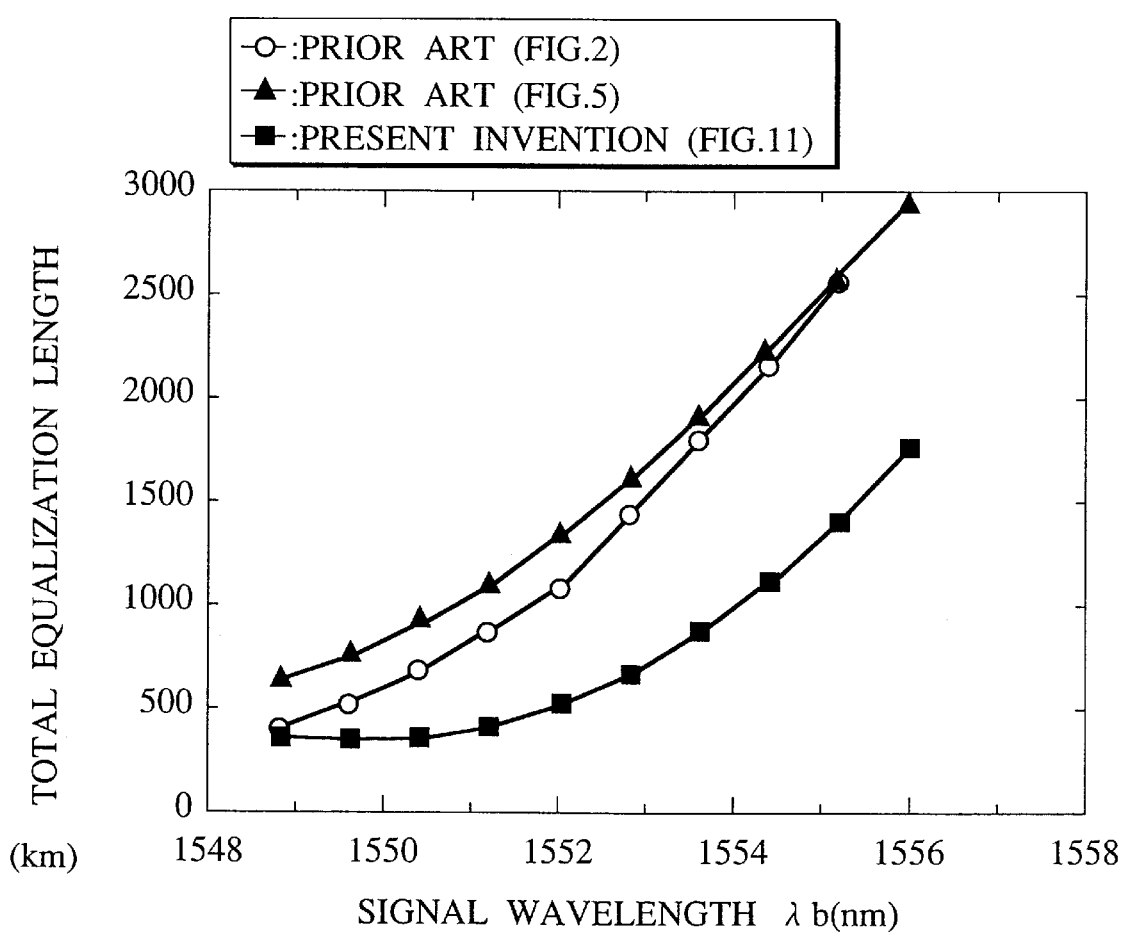
FIG. 14 is a diagram comparing overall lengths of dispersion compensation optical fibers required in a terminal unit.

FIG. 14 shows a comparison between the present embodiment and the prior arts depicted in FIG. 2 and FIG. 5, with respect to total equalization lengths of optical fibers needed under the condition of:

10 wavelength bands (channels);

wavelength intervals of 0.8 nm;

minimum wavelength being 1548.8 nm central wavelength 1552.8 nm;

transmission length of 9000 km;

average higher-order dispersion of 0.1 ps/km-nm$^2$.

It was assumed that 17 ps/km-nm 1.3 μm zero dispersion optical fiber was used when accumulated dispersion was negative, and −80 ps/km-nm dispersion equalization optical fiber was used when accumulated dispersion was positive.

As FIG. 14 clearly illustrates, according to the configuration of the first embodiment, the lengths of the dispersion equalization optical fibers inserted to the transmitters and receivers can be shortened.

Next, based upon FIG. 14, a comparison between the DCOF lengths in the prior art examples and in the present embodiment will be explained.

First, as a general description, the total length of equalization optical fiber required at a terminal station for n multiplexed channels will be expressed with following equations.

Let D be the dispersion deviation, caused by wavelength difference and higher-order dispersion, suffered by signal wavelength $\lambda_i$ after propagation over L (km). Now, $$D = m_d \cdot (\lambda_o - \lambda_i) \cdot L \quad (1)$$

where $m_d$ is the higher-order dispersion coefficient, and $\lambda_o$ is the wavelength at which the DCOF produces zero dispersion on the transmission line. Furthermore, when $D_c$ denotes the one segment dispersion of the transmission line, the total dispersion to be compensated in FIG. 2 is, $$D_T = D + D_c = m_d \cdot (\lambda_o - \lambda_i) \cdot L + D_c \quad (2)$$

Firstly, lengths of the DCOFs corresponding to channels i=1~n in the prior art example shown in FIG. 2 will be determined. At channels i=1~k, where the total dispersion $D_T \not< O$, the length of the optical fiber required is given:

$$[m_d \cdot (\lambda_i - \lambda_i) L + D_c]/D_+ \quad (3)$$

where $D_+$ is an absolute value of the dispersion coefficient for a positive dispersion DCOF. At channels i=k+1~n, where the total dispersion $D_T < O$, the length of the optical fiber required is given:

$$[m_d \cdot (\lambda_o - \lambda_i) \cdot L + D_c]/D_- \quad (4)$$

where $D_-$ is an absolute value of the dispersion coefficient for a negative dispersion DCOF.

In FIG. 6, when the transmitter and receiver sides are each compensated by 50% of the dispersion deviation resulting from wavelength difference and higher-order dispersion, the amount of dispersion to be compensated at the transmitter side is:

$$D_t = (\tfrac{1}{2}) \cdot m_d (\lambda_o - \lambda_i) \cdot L \quad (5)$$

The amount of dispersion to be compensated at the receiver side is:

$$D_r = (\tfrac{1}{2}) m_d (\lambda_o - \lambda_i) \cdot L + D_c \quad (6)$$

The sum of the lengths of the DCOFs at the transmitter and receiver sides for all channels can be determined as follows. At channels i=1~l, where the transmitter side dispersion $D_t \geq O$, the equation (3) holds. And at channels i =l+1 ~l+m, where the transmitter side dispersion $D_t < O$ and the receiver side dispersion $D_r < O$, the length of the optical fiber required is given:

$$(1/2) m_d \cdot |\lambda_0 - \lambda_i| \cdot L / D_- + [(1/2) m_d \cdot |\lambda_0 - \lambda_i| \cdot L + D_C]/D_+ \quad (7)$$

and at channels i=l+m+1~n, where the receiver side dispersion $D_r < O$, the equation(4) holds.

Next, lengths of the optical fibers required for dispersion compensation at the transmitter and receiver sides for each wavelength in the first embodiment shown in FIG. 12 will be determined. At channels i=1~l where the transmitter side dispersion $D_t \geq O$, the length of the optical fiber required is given:

$$[m_d \cdot (\lambda_o - \lambda_i) \cdot L] / D_+ \quad (8)$$

and at channels i =l+1~n, where the transmitter side dispersion $D_t < O$, the length of the optical fiber required is given:

$$[m_d \cdot |\lambda_o - \lambda_i| \cdot L] / D_{13} \quad (9)$$

Now let us compare the overall lengths of DCOFs required in the prior art example and in the first embodiment.

At first, we subtract the total DCOF length of FIG. 11 from the total DCOF length of FIG. 2. Since the one segment dispersion $D_c \geq O$, and l$\Delta$k, the difference $\Delta$ between these lengths can be expressed with the following equation:

$$\Delta = \sum_{i=l+1}^{k} m_d \cdot |\lambda_0 - \lambda_i| \cdot (1/D_+ - 1/D_-) +$$
$$D_C/D_+ \cdot k - D_C/D_- \cdot (n-1)$$
$$= \sum_{i=l+1}^{k} m_d \cdot |\lambda_0 - \lambda_i| \cdot (1/D_+ - 1/D_-) +$$
$$D_C/D_+ \cdot [k - (n-1)] \quad (10)$$

Next, the difference with the prior art example, or the difference $\Delta$ between the total DCOF length of FIG. 12 and the total DCOF length of FIG. 6 becomes:

$$\Delta = \sum_{i=l+1}^{l+m} m_d \cdot |\lambda_0 - \lambda_i| \cdot (1/D_+ - 1/D_-) +$$
$$D_C/D_+ \cdot (l+m) - D_C/D_- \cdot [n - (l+m)]$$
$$= \sum_{i=l+1}^{l+m} m_d \cdot |\lambda_0 - \lambda_i| \cdot (1/D_+ - 1/D_-) +$$
$$D_C/D_+ \cdot [(l+m) - \{n - (l+m)\}] \quad (11)$$

With respect to the negative dispersion accumulation, the dispersion $D_+$ of a 1.55 μm wavelength band for an optical fiber, which has zero dispersion at a wavelength band of 1.3 μm, is approximately +17 ps/km-nm. The absolute value of dispersion $D_{13}$ of a DCOF used to compensate accumulation of negative dispersion is normally 40~80 ps/km-nm. Hence, the following relation holds:

$$(1/D_+ - 1/D_-) > 0 \quad (12)$$

Furthermore, since the zero dispersion wavelength for compensating dispersion on the transmission line is normally set on the central wavelength band or longer wavelength bands of the WDM signal wavelength bands, $n/2 \leq 1$. Therefore, in the case shown in FIG. 2, $$n - l \leq n/2 \leq k \quad (13)$$

then, $$n - l < k \quad (14)$$

And from equation (10), the relation $\Delta > O$ is given. Then, it is clear that DCOF length is shorter in the first embodiment of the present invention (FIG. 11) than the prior art configuration shown in FIG. 2. Similarly, for the system configuration shown in FIG. 5, since $$n-(l+m) \leq l+m \tag{15}$$

equation (11) gives Δ>O. Then, the DCOF length of the first embodiment of the present invention (FIG. 11) is shorter than the prior art configuration shown in FIG. 5.

As the results shown in FIG. 14 illustrate, the present embodiment enables dispersion equalization optical fibers disposed at the transmitter and receiver sides to be shortened, even in a case where the zero dispersion wavelength (the wavelength which has zero dispersion when dispersion compensation is carried out on the transmission line) is varied in the signal wavelength range.

A MODIFICATION OF THE FIRST EMBODIMENT

Figure 15:
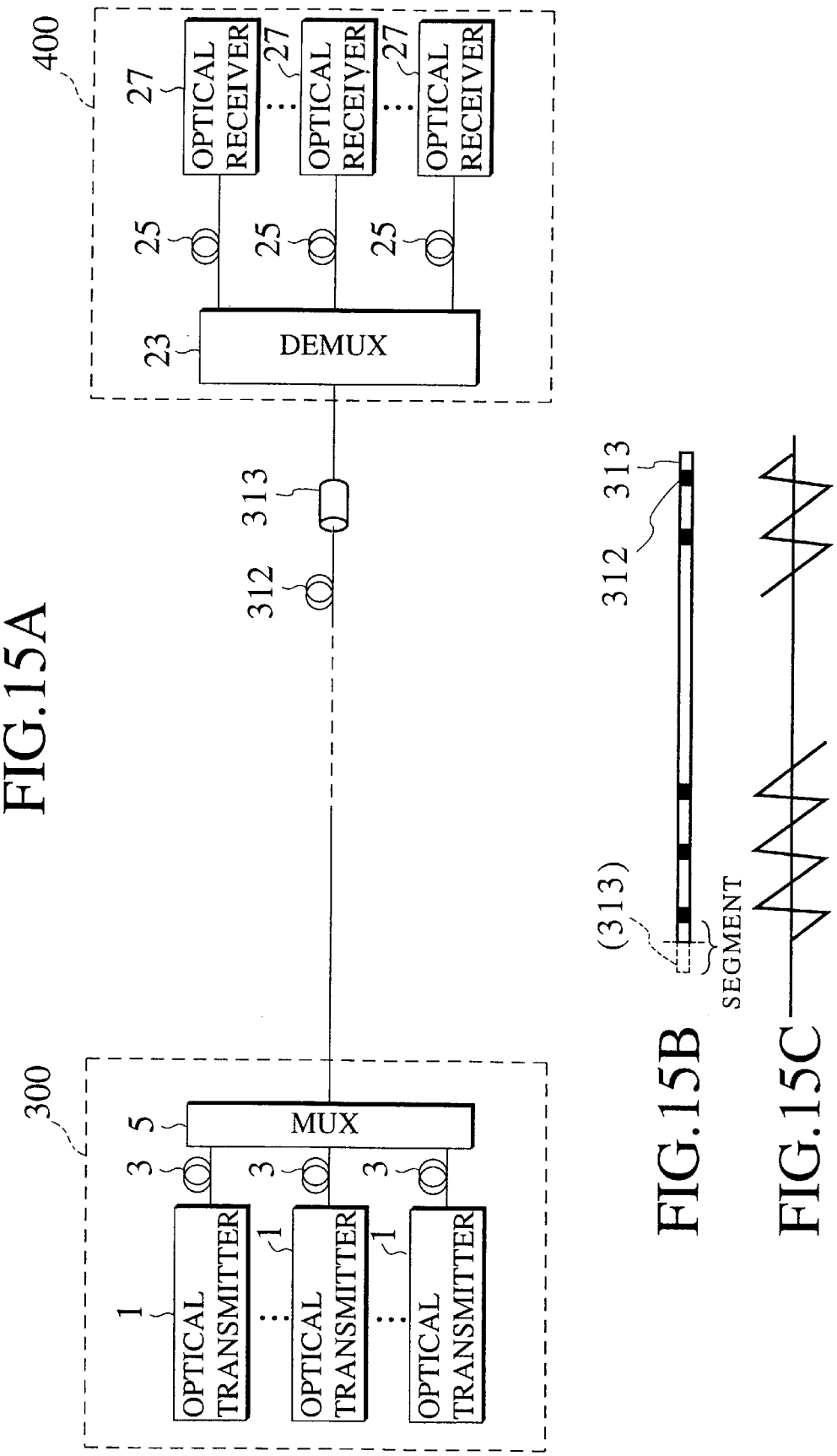
FIG. 15A is a block diagram illustrating a diagrammatic configuration of the WDM optical transmission system according to a modification of the first embodiment.
FIG. 15B is a schematic view showing the optical fiber cable comprising a plurality of segments used for the WDM optical transmission system depicted in FIG. 15A.
FIG. 15C is a diagram showing the relation between the accumulated wavelength dispersion at central wavelength and the segments shown in FIG. 15B.

FIG. 15A is a block diagram illustrating a diagrammatic configuration of the WDM optical transmission system according to a modification of the first embodiment. FIG. 15B is a schematic view showing the optical fiber cable comprising a plurality of segments used for the WDM optical transmission system depicted in FIG. 15A, and FIG. 15C is a diagram showing the relation between the accumulated wavelength dispersion at central wavelength and the segments shown in FIG. 15B.

Figure 16:
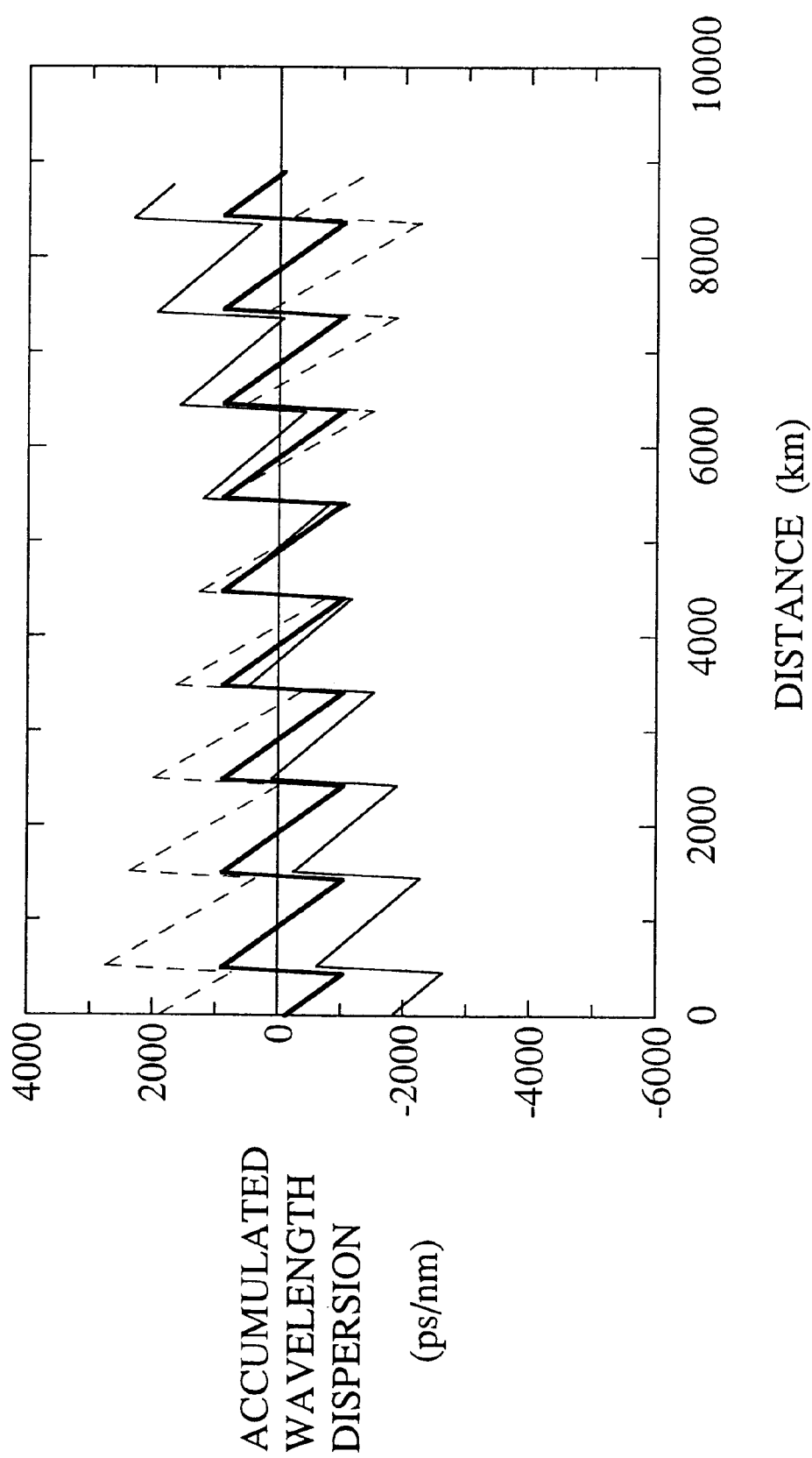
FIG. 16 is a diagram explaining accumulated wavelength dispersion at each wavelength when wavelength bands are multiplexed in the WDM optical transmission system of FIG. 15A.

In this modification of the first embodiment of the present invention, the DCOF 312 having the dispersion compensation amount corresponding to one segment dispersion $D_c$ of the transmission line is connected to one end of the transmission cable. Further, a half of the segment 313 shown with dashed line in FIG. 15B is removed from the opposing end, and connected to the one end through the DCOF 312. In this configuration, there is no detrimental effect on the two-way symmetry of the accumulated dispersion of the transmission line, as further illustrated in FIG. 16. Namely, the subject-matter of the first embodiment of the present invention is applicable to such a configuration shown in FIG. 15A.

According to the WDM optical transmission system of the modification of the first embodiment, the lengths of the DCOFs in the chromatic dispersion compensating transmitter and receiver units can be shortened, enabling the scale of the WDM optical transmission system to be reduced and made economical while improving transmission characteristics.

(SECOND EMBODIMENT)

Figure 17:
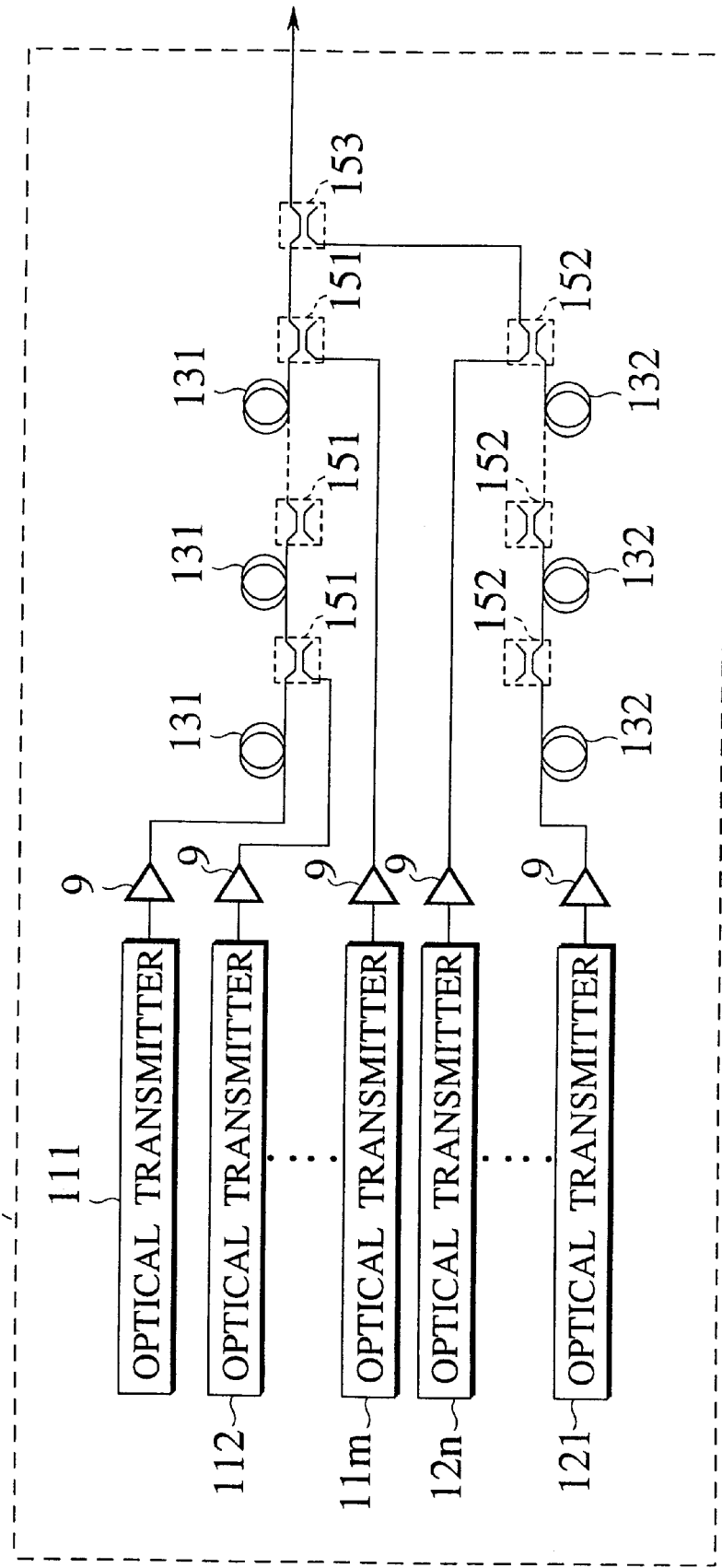
FIG. 17 is a block diagram showing a chromatic dispersion compensating transmitter unit according to a second embodiment of the present invention.

FIG. 17 shows an example configuration of the chromatic dispersion compensating transmitter unit 300 according to a second embodiment of the present invention. In FIG. 17, the optical transmitters 111, 112, ..., 11m share 1.3 μm zero dispersion optical fibers 131 for compensating negative wavelength dispersion. And the optical transmitters 121,... 12n share negative dispersion equalization optical fibers 132 for compensating positive wavelength dispersion.

Firstly, all optical transmitters 111, 112, ..., 11m corresponding to wavelength bands which accumulate negative dispersion are collected together to form a first dispersion compensating group. In the first dispersion compensating group, 1.3 μm zero dispersion optical fiber 131 of appropriate length is connected to a first optical transmitter 111 corresponding to the minimum wavelength, and if necessary the transmission output is amplified to an appropriate value using an optical amplifier 9. The second minimum wavelength band signal from a second optical transmitter 112 is combined midway by means of first couplers 151 with the minimum wavelength band signal, since the amount of equalization dispersion for the second minimum wavelength band signal is smaller than the minimum wavelength band. And, the third minimum wavelength band signal from a third optical transmitter is combined midway by means of second couplers 151 with the minimum wavelength band signal. Similarly, the other wavelength bands from other optical transmitters ( ..., 11m) are combined midway by means of couplers 151 with the minimum wavelength band signal and jointly multiplexed. And, the optical transmitters 121, ..., 12n corresponding to longer wavelength bands which accumulate positive dispersion are equalized using negative dispersion equalization optical fibers 132 to form a second dispersion compensating group. In the second dispersion compensating group, the second maximum wavelength band signal from second optical transmitter is combined midway by means of a first coupler 152 with the maximum wavelength band signal, since the amount of equalization dispersion for the second maximum wavelength band signal is smaller than the maximum wavelength band sent by a first optical transmitter 121. And, the third maximum wavelength band signal from third optical transmitter is combined midway by means of a second coupler 152 with the maximum wavelength band signal. Similarly, the other wavelength bands from other optical transmitters (..., 12n) are combined midway by means of couplers 152 with the maximum wavelength band signal and jointly multiplexed. Lastly, both are multiplexed together by means of couplers 153, whereafter the wavelength levels are adjusted as necessary using an optical amplifier.

Figure 18:
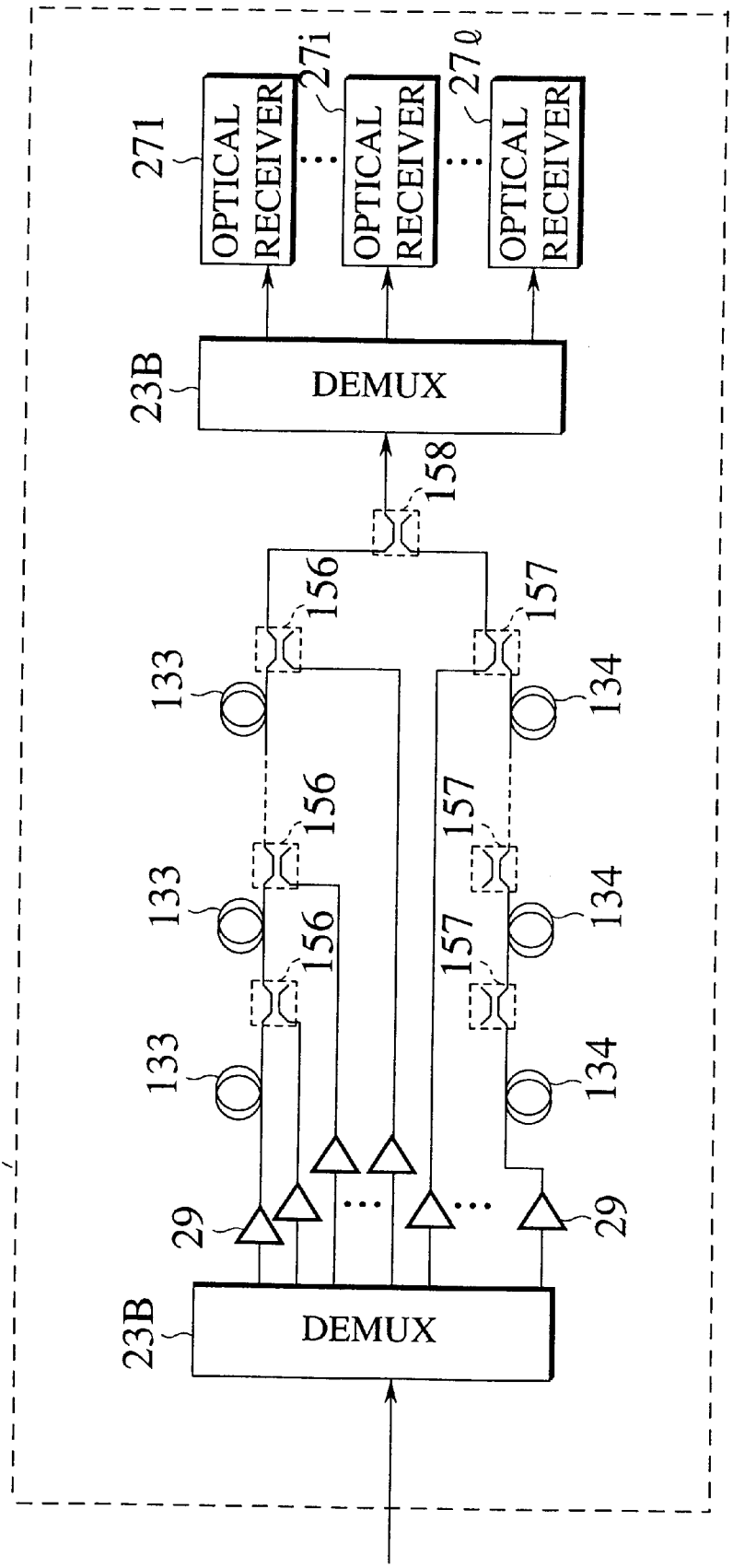
FIG. 18 is a block diagram showing an example of a chromatic dispersion compensating receiver unit according to a second embodiment of the present invention.

FIG. 18 shows an example configuration of the chromatic dispersion compensating receiver unit 400 according to the second embodiment of the present invention. In FIG. 18, a first dispersion compensating multiplexing group shares 1.3 μm zero dispersion optical fibers (DCOFs) 133 for compensating negative wavelength dispersion. Also, a second dispersion compensating-multiplexing group shares negative dispersion equalization optical fibers (DCOFs) 134 for compensating positive wavelength dispersion.

At the chromatic dispersion compensating receiver unit 400, an incoming multiplexed signal is first split into its respective wavelength bands by, for instance, a first demultiplexer 23B using an array waveguide pattern. After splitting, the wavelength bands are dispersion equalized in the same way as FIG. 17. Firstly, all split signal corresponding to wavelength bands which accumulate negative dispersion are collected together to form the first dispersion compensating-multiplexing group. And in the first dispersion compensating-multiplexing group, 1.3 μm zero dispersion optical fiber 133 of appropriate length is connected to a signal line passing an optical signal corresponding to the minimum wavelength, and if necessary the split signal is amplified to an appropriate value using an optical amplifier 29. The second minimum wavelength band signal from is combined midway by means of first couplers 156 with the minimum wavelength band signal, since the amount of equalization dispersion for the second minimum wavelength band signal is smaller than the minimum wavelength band. And, the third minimum wavelength band signal is combined midway by means of second couplers 156 with the minimum wavelength band signal. Similarly, the other wavelength bands are combined midway by means of couplers 156 with the minimum wavelength band signal and jointly multiplexed. On the contrary, split signal corresponding to longer wavelength bands which accumulate positive dispersion are equalized using negative dispersion equalization optical fibers 134 in the second dispersion compensation multiplexing group. In the second dispersion compensating multiplexing group, the second maximum wavelength band signal is combined midway by means of a first coupler 157 with the maximum wavelength band signal, since the amount of equalization dispersion for the second maximum wavelength band signal is smaller than the maximum wavelength band. And, the third maximum wavelength band signal is combined midway by means of a second coupler 157 with the maximum wavelength band signal. Similarly, the other wavelength bands are combined midway by means of couplers 157 with the maximum wavelength band signal and jointly multiplexed. Lastly, both are multiplexed together by means of couplers 158. Then, the dispersion-equalized multiplexed signal is split once again by the second demultiplexer 23B before being received by the optical receiver 271, 27i, ..., 271. Thus, the signal is dispersion-equalized at each wavelength prior to reception by the optical receivers 271, 27i, ..., 271.

Various modifications will become possible for those skilled in the art after receiving the teaching of the present disclosure without departing from the scope thereof.

What is claimed is:

1. A wavelength-division multiplexing optical transmission system for transmitting bidirectionally a plurality of optical signals having different wavelength bands, the system comprising:
   (a) a two-way optical fiber cable having a pair of optical fibers, the optical fiber cable comprising a plurality of segments;
   (b) a first dispersion compensation optical fiber connected to one end of the optical fiber cable, having a compensation amount of a half of a one segment dispersion of the optical fiber cable;
   (c) a second dispersion compensation optical fiber connected to another end of the optical fiber cable, having the compensation amount of the half of the one segment dispersion of the optical fiber cable;
   (d) a chromatic dispersion compensating transmitter unit for compensating accumulated residual chromatic dispersions to be caused by higher-order wavelength dispersion of said optical fiber cable at each signal wavelength; and
   (e) a chromatic dispersion compensating receiver unit for compensating accumulated residual chromatic dispersions caused by higher-order wavelength dispersion of said optical fiber cable at each signal wavelength.

2. The optical transmission system of claim 1, wherein said chromatic dispersion compensating transmitter unit comprising:
   a plurality of optical transmitters sending the optical signals having different wavelength bands respectively;
   a multiplexer combining the plurality of different wavelength bands; and
   a plurality of chromatic dispersion compensators connected between the respective optical transmitters and the multiplexer.

3. The optical transmission system of claim 2, wherein each of said chromatic dispersion compensator is a dispersion compensation optical fiber having the compensation amount of 20%~70% of the total dispersion compensation amount required for wavelength dispersion caused by the higher-order wavelength dispersion of the optical fiber cable.

4. The optical transmission system of claim 3, wherein said dispersion compensation optical fibers comprising:
   optical fibers, having zero dispersion at 1.3 $\mu$m wavelength band, for wavelength bands accumulating negative dispersions; and
   optical fibers, having zero dispersion at 1.5 $\mu$m wavelength band, for wavelength bands accumulating positive dispersions.

5. The optical transmission system of claim 2, wherein each of said chromatic dispersion compensator is a dispersion compensation optical fiber having the compensation amount given by subtracting the half of the one segment dispersion of the optical fiber cable from 20%~70% of the total dispersion compensation amount required for wavelength dispersion caused by the higher-order wavelength dispersion of the optical fiber cable.

6. The optical transmission system of claim 1, wherein said chromatic dispersion compensating receiver unit comprising:
   a demultiplexer splitting multiplexed optical signals into the different wavelength bands;
   a plurality of optical receiver for receiving the split optical signals; and
   a plurality of chromatic dispersion compensators connected between the respective optical receivers and the demultiplexer.

7. The optical transmission system of claim 6, wherein each of said chromatic dispersion compensator is a dispersion compensation optical fiber having the compensation amount of 80%~30% of the total dispersion compensation amount required for wavelength dispersion caused by the higher-order wavelength dispersion of the optical fiber cable.

8. The optical transmission system of claim 7, wherein said dispersion compensation optical fibers comprising:
   optical fibers, having zero dispersion at 1.3 $\mu$m wavelength band, for wavelength bands accumulating negative dispersions; and
   optical fibers, having zero dispersion at 1.5 $\mu$m wavelength band, for wavelength bands accumulating positive dispersions.

9. The optical transmission system of claim 6, wherein each of said chromatic dispersion compensator is a dispersion compensation optical fiber having the compensation amount given by a sum of the half of the one segment dispersion of the optical fiber cable and 80%~30% of the total dispersion compensation amount required for wavelength dispersion caused by the higher-order wavelength dispersion of the optical fiber cable.

10. The optical transmission system of claim 1, wherein said chromatic dispersion compensating transmitter unit comprising a first dispersion compensating group having wavelength bands which accumulate negative dispersion and a second dispersion compensating group having wavelength bands which accumulate positive dispersion, and wavelength bands from the first and second group is combined by a coupler.

11. The optical transmission system of claim 10, wherein said first dispersion compensating group comprising:
    a first optical transmitter sending a first optical signal having a minimum wavelength signal;
    a second optical transmitter sending a second optical signal having a second minimum wavelength signal;
    a third optical transmitter sending a third optical signal having a third minimum wavelength signal;
    a first coupler combining the first and second optical signal;
    a second coupler combining the first and third optical signal;
    a first dispersion compensation optical fibers having zero dispersion at 1.3 $\mu$m wavelength bands, connected between the first optical transmitter and the first coupler; and a second dispersion compensation optical fibers having zero dispersion at 1.3 µm wavelength bands, connected between the first and second couplers.

12. The optical transmission system of claim 10, wherein said second dispersion compensating group comprising:

a first optical transmitter sending a first optical signal having a maximum wavelength signal;

a second optical transmitter sending a second optical signal having a second maximum wavelength signal;

a third optical transmitter sending a third optical signal having a third maximum wavelength signal;

a first coupler combining the first and second optical signal;

a second coupler combining the first and third optical signal;

a first dispersion compensation optical fibers having zero dispersion at 1.5 µm wavelength bands, connected between the first optical transmitter and the first coupler; and a second dispersion compensation optical fibers having zero dispersion at 1.5 µm wavelength bands, connected between the first and second couplers.

13. The optical transmission system of claim 1, wherein said chromatic dispersion compensating receiver unit comprising:

a first demultiplexer splitting multiplexed optical signals into the different wavelength bands;

a first dispersion compensating-multiplexing group combining wavelength bands which accumulate negative dispersion;

a second dispersion compensating-multiplexing group combining wavelength bands which accumulate positive dispersion;

a coupler combining wavelength bands from the first and second compensating-combining group;

a second demultiplexer splitting the combined wavelength bands by the coupler into the different wavelength bands; and a plurality of optical receiver for receiving the split optical signals by the second demultiplexer.

14. The optical transmission system of claim 13, wherein said first dispersion compensating-multiplexing group comprising:

a first coupler combining a first optical signal having a minimum wavelength signal and a second optical signal having a second minimum wavelength signal;

a second coupler combining the first optical signal and a third optical signal having a third minimum wavelength signal;

a first dispersion compensation optical fibers having zero dispersion at 1.3 µm wavelength bands for dispersion compensating the first optical signal; and a second dispersion compensation optical fibers having zero dispersion at 1.3 µm wavelength bands, connected between the first and second couplers.

15. The optical transmission system of claim 13, wherein said second dispersion compensating-multiplexing group comprising:

a first coupler combining a first optical signal having a maximum wavelength signal and a second optical signal having a second maximum wavelength signal;

a second coupler combining the first optical signal and a third optical signal having a third maximum wavelength signal;

a first dispersion compensation optical fibers having zero dispersion at 1.5 µm wavelength bands for dispersion compensating the first optical signal; and a second dispersion compensation optical fibers having zero dispersion at 1.5 µm wavelength bands, connected between the first and second couplers.

16. A wavelength-division multiplexing optical transmission system for transmitting bidirectionally a plurality of optical signals having different wavelength bands, the system comprising:

(a) a two-way optical fiber cable having a pair of optical fibers, the optical fiber cable comprising a plurality of segments;

(b) a dispersion compensation optical fiber connected to one end of the optical fiber cable, having a compensation amount of one segment dispersion of the optical fiber cable;

(c) a half of the segment of the optical fiber cable connected to the one end of the optical fiber cable through the dispersion compensation optical fiber;

(d) a chromatic dispersion compensating transmitter unit for compensating accumulated residual chromatic dispersions to be caused by higher-order wavelength dispersion of said optical fiber cable at each signal wavelength; and (e) a chromatic dispersion compensating receiver unit for compensating accumulated residual chromatic dispersions caused by higher-order wavelength dispersion of said optical fiber cable at each signal wavelength.

17. The optical transmission system of claim 16, wherein said chromatic dispersion compensating transmitter unit comprising:

a plurality of optical transmitters sending the optical signals having different wavelength bands respectively;

a multiplexer combining the plurality of different wavelength bands; and a plurality of chromatic dispersion compensators connected between the respective optical transmitters and the multiplexer.

18. The optical transmission system of claim 17, wherein each of said chromatic dispersion compensator is a dispersion compensation optical fiber having the compensation amount of 20%~70% of the dispersion compensation amount required for wavelength dispersion caused by the higher-order wavelength dispersion of the optical fiber cable.

19. The optical transmission system of claim 16, wherein said chromatic dispersion compensating receiver unit comprising:

a demultiplexer splitting multiplexed optical signals into the different wavelength bands;

a plurality of optical receiver for receiving the split optical signals; and a plurality of chromatic dispersion compensators connected between the respective optical receivers and the demultiplexer.

20. The optical transmission system of claim 19, wherein each of said chromatic dispersion compensator is a dispersion compensation optical fiber having the compensation amount of 80%~30% of the dispersion compensation amount required for wavelength dispersion caused by the higher-order wavelength dispersion of the optical fiber cable.

* * * * *

UNITED STATES PATENT AND TRADEMARK OFFICE
CERTIFICATE OF CORRECTION

PATENT NO. : 6,021,235
DATED : February 1, 2000
INVENTOR(S) : Yamamoto et al.

It is certified that error appears in the above-identified patent and that said Letters Patent is hereby corrected as shown below:

Column 9, line 47, change "$D_t=(½)·m_d(\lambda_o-\lambda_i)·L$" to read $D_t=(½)m_d·(\lambda_o-\lambda_i)·L$ Column 10, line 10, change "$[m_d·|\lambda_o-\lambda_i|·L]/D_{13}$" to read $[m_d·|\lambda_o-\lambda_i|·L]/D$ Column 11, line 3, change "$n-(1+m)\leq1+m$" to read $n-(1+m)\leq1+m$ Signed and Sealed this Twenty-first Day of November, 2000

Attest:

Q. TODD DICKINSON

*Attesting Officer*     *Director of Patents and Trademarks*